Oct. 8, 1940.  M. ANDIS  2,216,797
SHAVING DEVICE
Filed Jan. 6, 1938   3 Sheets-Sheet 1

INVENTOR.
Mathew Andis
BY
ATTORNEYS.

Oct. 8, 1940.　　　　　M. ANDIS　　　　　2,216,797
SHAVING DEVICE
Filed Jan. 6, 1938　　　3 Sheets-Sheet 2

INVENTOR.
Mathew Andis
BY Morsell, Lieber & Morsell
ATTORNEYS.

Oct. 8, 1940.  M. ANDIS  2,216,797
SHAVING DEVICE
Filed Jan. 6, 1938  3 Sheets-Sheet 3
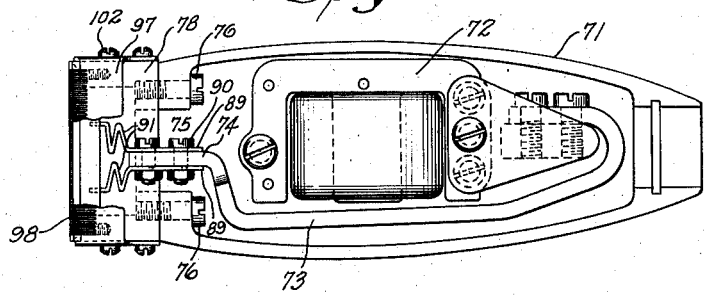
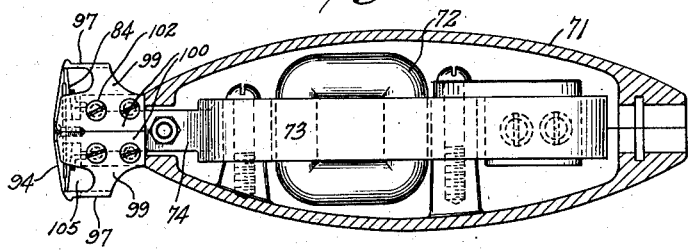
   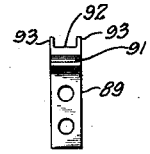
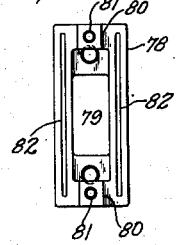 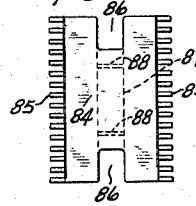 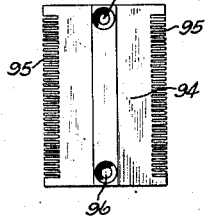
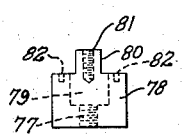 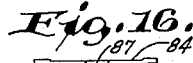  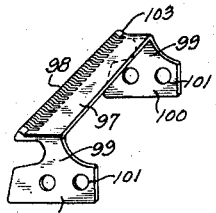
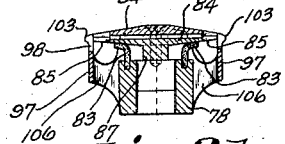 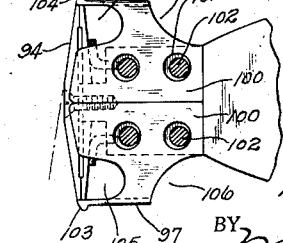 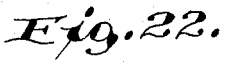
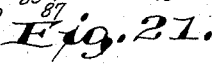
INVENTOR.
Mathew Andis
BY
Morsell Lieber Morsell
ATTORNEYS Patented Oct. 8, 1940

2,216,797

UNITED STATES PATENT OFFICE 2,216,797

SHAVING DEVICE

Mathew Andis, Racine, Wis.

Application January 6, 1938, Serial No. 183,599

6 Claims. (Cl. 30—43)

This invention relates to improvements in shaving devices.

The invention relates more particularly to shaving devices of the type having a reciprocating cutter, driven by an electric motor or other suitable means, and movable beneath a slotted face engaging part, whereby the device may be used without soap or other beard softening agent to greatly facilitate the shaving operation.

It is desirable in shaving devices of this type to utilize a guard member, preferably in the form of a slotted comb, for the purpose of protecting the face from the cutter and for the purpose of picking up and straightening out the hair on the face and properly guiding the same to cutting position. In the majority of dry shavers this comb is formed in side walls which are integral with the top of the head and which extend downwardly therefrom, the upper portions of these side walls being formed with slots which communicate with the slots of the top portion of the head. With this arrangement, due to the fact that the side walls forming the comb are integral with the edges of the top portion, there is necessarily a limit to the thinness of the metal at these edges, and extreme thinness is always desirable, as it effects the closeness of the shave. Furthermore where integral side walls extend downwardly from the top of the head and join a lower portion of the head, the cut hair is confined between said side walls making it necessary to clean the shaving head after use.

In application Serial No. 124,417, filed February 6th, 1937, there is disclosed a shaving device wherein the slotted edge of the fixed cutter or face engaging member is free and of extreme thinness, and wherein a separate comb member is employed, which comb member is so supported that its lower edge is free whereby there is no obstruction to prevent cut hair from falling freely exteriorly of the head. In the use of this device it has been found that the amount of gap between the comb and the edge of the fixed cutter is an item of extreme importance as affecting the closeness of the shave and the degree of comfort in use. It has also been found that there must be a definite relationship between the amount of gap and the position of the forward edge of the comb member, that is the amount which this forward edge of the comb or guard projects beyond the plane of the face engaging member. Generally speaking, where the skin is relatively loose, such as on an older person, the gap between the guard and the edge of the fixed cutter should be relatively small to avoid irritation of the face, and where the skin is relatively tough and not so loose, a larger gap may be employed. Where a small gap is used, then the forward edge of the guard may be relatively low and may be in substantially the plane of the face of the fixed cutter. Where a larger gap is employed, however, then the guard should project slightly beyond the plane of the fixed cutter. These critical relationships between the parts of an electric shaver, and which are measured in terms of thousandths of an inch, heretofore necessitated very refined work in assembly, and where a product is produced on a large scale, the obtaining of uniform perfection is impossible, and unsatisfactory results are necessarily obtained by users of imperfectly assembled devices. In addition to the above, even assuming that all of the shavers are assembled in a perfect manner, it is still not possible for devices now on the market to be adapted for all types of skin and beard because there is a wide variation in requirements.

It is therefore an object of the present invention to provide an improved electric shaving device of the type having a guard or comb member which is independent of the fixed cutter, wherein said guard is mounted in a novel manner to permit variation in the critical relationship between the guard and the fixed cutter.

A more specific object of the invention is to provide a device as above described wherein a variation may be simultaneously effected in the width of the gap and in the position of the forward edge of the guard with respect to the plane of the face engaging member.

It is also desirable for certain skin conditions to eliminate the gap between the guard and fixed cutter entirely and to have the forward edge of the guard in substantially the plane of the face engaging member, and certain forms of the invention make it possible to obtain this relationship between the parts.

A further object of the invention is to provide a device as above described which may be constructed with two cutting edges, each having a guard, said guards being so mounted and formed as to permit independent variation in the critical relationship between the guard and fixed cutter on each side.

A further specific object of the invention is to provide in a device as above described, improved means forming a seal beneath the movable cutter for preventing cut hair from entering the mechanism at this point.

With the above and other objects in view, the invention consists of the improved shaving device and all its parts and combinations as set forth in the claims and all equivalents thereof.

In the accompanying drawings illustrating several preferred embodiments of the invention, in which the same reference numerals designate the same parts in all of the views:

Fig. 11 is a view showing still another modification with half of the handle removed and parts broken away;

Fig. 12 is a view looking at the top of Fig. 11, parts being shown in section;

Fig. 13 is a plan view of the supporting block for the head;

Fig. 14 is an end view of said supporting block;

Fig. 15 is a plan view of the movable cutter;

Fig. 16 is an end view of the movable cutter showing the connection of one of the armature springs therewith;

Fig. 17 is a plan view of the fixed cutter or face engaging member;

Fig. 18 is an end view thereof;

Fig. 19 is a detailed view of one of the armature springs;

Fig. 20 is a perspective view of one of the guard members;

Fig. 21 is a cross sectional view through the shaving head; and

Fig. 22 is an end view of the shaving head on an enlarged scale, parts being broken away.

Figure 1:
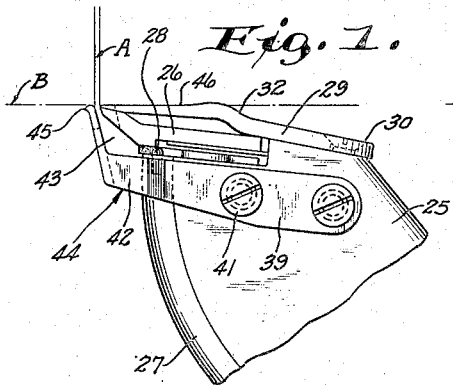
Fig. 1 is a fragmentary side view of the shaving device on an enlarged scale.

Referring more particularly to Figs. 1 to 5 of the drawings, the numeral 25 designates a hollow handle portion formed of any suitable material and forming a housing for an electric motor and associated mechanism employed to cause rapid reciprocation of a movable cutter 26. This mechanism for driving the cutter may be of the type illustrated in copending application Serial No. 124,417, filed February 6, 1937 and which issued as Patent 2,152,677 on April 4, 1939. The handle portion may be closed by a removable cover 27, in any desired manner, which cover has its end edge recessed through its length to receive an elongated strip of felt or other material 28. The felt may be held in position in the cover by adhesive or any other suitable means. As illustrated in the drawings, the felt is of sufficient width so that it may be bent outwardly beneath the movable cutter 26 to frictionally engage the bottom of the same. A seal is thus formed to prevent cut hair from working beneath the cutter into the handle portion.

The fixed cutter or face engaging member 29 is generally of rectangular outline and is formed with a pair of countersunk bolt holes 30 adjacent its rear edge whereby the face engaging member may be secured to the handle by bolts 31. Intermediate its length the face engaging member is preferably formed with an offset 32, and the free edge of the face engaging member is tapered to extreme thinness and is formed with a plurality of minute inwardly extending slots 33. These slots are preferably no wider than is necessary to accommodate one or two hairs.

The free edge of the movable cutter 26 is formed with a plurality of spaced cutting teeth 34 which are movable below the slots 33 of the face engaging member 29 and adjacent the free edge of said face engaging member. When the electric motor is energized, the movable cutter 26 is reciprocated at a very rapid rate to cause shearing of hair extending through the slots 33 of the face engaging member. By having the edge of the face engaging member free, it is possible to grind said edge down to extreme thinness.

In order to guard the face from the free edge of the face engaging member and from the movable cutter, it is desirable to utilize a guard or comb member in advance of the free edge of the face engaging member. This comb member presents a smooth surface to the face and is preferably slotted to pick up and straighten out the hair on the face and to guide the hair into the slots 33 of the face engaging member. Heretofore the majority of shaving devices have had integral side portions extending from the edge of the fixed cutter downwardly therefrom and joining a lower portion of the head. These side walls have been slotted with slots communicating with the slots of the fixed cutter to thereby form a comb. With this arrangement, however, there must always be sufficient thickness of metal at the edge of the face engaging member to join said edge to the depending side. Therefore in this type of device the edge of the face engaging member cannot be ground down to the thickness that is possible with the present invention where the edge of the face engaging member is free. Furthermore with these prior constructions the wide portions forming the comb also formed a trap for the cut hair, making it necessary to clean the device after use. In co-pending application Serial No. 124,417 a separate comb member is illustrated, which comb member is so supported as to eliminate the possibility of trapping cut hair. The present invention while having features in common with said prior application, is nevertheless an improvement thereover in that novel means is employed for supporting the guard or comb member, which means accomplishes all of the purposes of the prior construction in a more effective way and at the same time permits variations in the critical relationship between the position of the guard and the face engaging member, and various ways of supporting the guard to accomplish this purpose have been illustrated and will be described.

Figure 2:
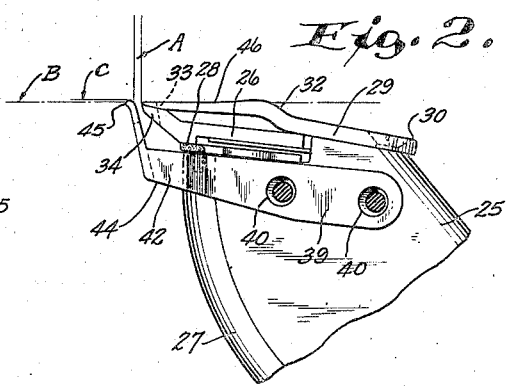
Fig. 2 is a similar view illustrating a variation in the critical relationship between the guard and fixed cutter, parts being broken away and shown in section.
Figure 3:
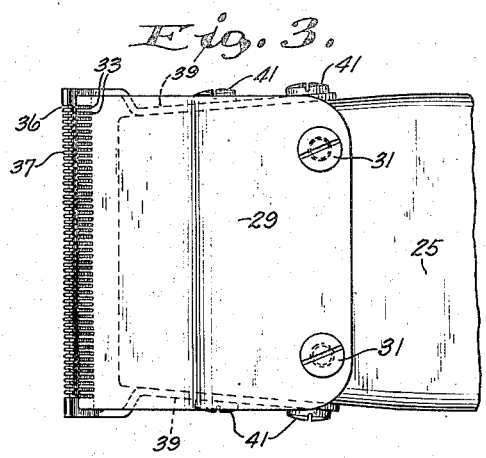
Fig. 3 is a view looking at the top of the shaving head on an enlarged scale.

In the form of invention shown in Figs. 1 to 5 inclusive, the comb or guard member 35 has its upper edge slotted as at 36 by slots which are substantially the same width as the slots 33 of the face engaging member, and which serve to pick up and straighten out the hair on the face and guide the same into the slots 33. The teeth 37 between the slots on the comb have their ends rounded to present a smooth surface to the face. Extending at substantially right angles to the guard and preferably formed integral therewith are supporting arms 39 having bolt openings 40 therein. Bolts 41 extending through said openings are threaded into the handle portion 25. The openings 40 are of slightly larger diameter than the stems of the bolts 41 as illustrated in Fig. 2 for a purpose to be hereinafter described. This difference in diameter between the openings 40 and stems of the bolts 41 is preferably one-thirty-second of an inch.

The portions of the arms 39 which connect with the guard are preferably of restricted width as at 42 and are connected only to the lower portions of the ends of the guard to leave an end opening 43 for the reception of a cleaning brush. The portions 42 of the arms also project sufficiently far beyond the handle to provide a space 44 directly beneath the teeth of the cutter 26 through which cut hair may fall freely to the exterior.

Figure 5:
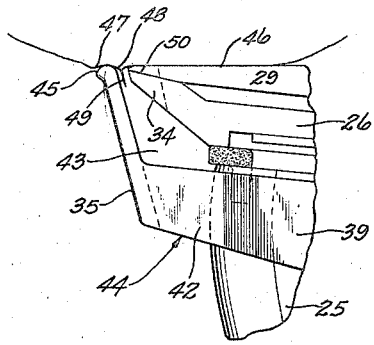
Fig. 5 is a fragmentary detailed view showing the relationship between the guard and cutting members on an exaggerated scale.
Figure 4:
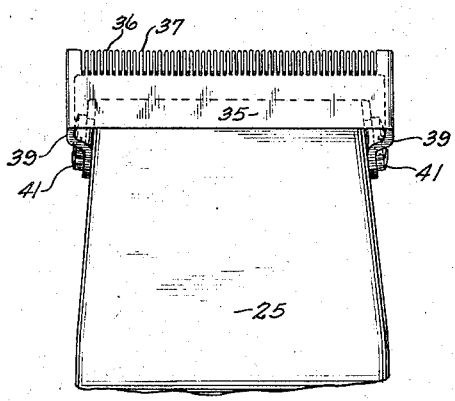
Fig. 4 is a fragmentary bottom view looking at the front of the guard.

Referring to Fig. 1, the letter A designates a relatively small gap between the forward edge 45 of the guard and the free edge of the fixed cutter 29. This gap may be approximately ten thousandths of an inch. With a gap of this size it is desirable that the edge 45 of the guard extend substantially to the plane of the face engaging portion 46 of the fixed cutter as indicated by line B. For certain types of skin it is desirable to have the gap A somewhat larger as illustrated in Fig. 2. When said gap is enlarged, however, in order to avoid irritation to the face, it is important that the forward edge 45 of the guard be projected slightly beyond the line B to the line C, for example. In Fig. 5 there is illustrated on exaggerated scale, the condition which it is desired to obtain for perfect shaving, and it may be seen that the skin is depressed as at 47 by the forward edge of the guard and then bulges slightly as at 48 into the gap between the guard and face engaging member. It is desired that this bulge 48 be such as to bring the base of the hair 49 in alinement with the shearing contact 50 between the fixed and movable cutters. If the gap is too large and the skin relatively loose, then the bulge 48 may be beyond the line 50 with the result that the skin will be nipped or irritated by the cutting action. If the bulge 48 of the skin is too little, then a close shave will not be effected. The amount of bulge at 48 in the skin may be more or less with the same width of gap depending upon the nature of the skin. It will thus be seen that the width of this gap and the position of the forward edge of the guard with respect to the plane of the face engaging portion 46 must be different for different people, and this relationship between the parts is critical as affecting the closeness of the cut and the degree of comfort obtained in shaving.

With the present invention the entire shaver may be first assembled at the factory, with the exception of the guard, and the clearance at 40 around the bolts 41 will permit a final adjustment to be quickly made, and the adjustment may be indicated on a slip to be packed with the shaver, as being suitable for a particular type of skin. Thus the razors may be assembled with various types of adjustment. It is also possible for the dealer to make this final adjustment at the time of purchase, or for the purchaser to do it himself.

Figure 6:
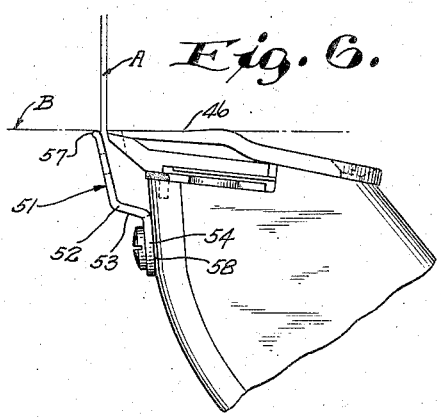
Fig. 6 is a fragmentary side view illustrating a modified form.
Figure 7:
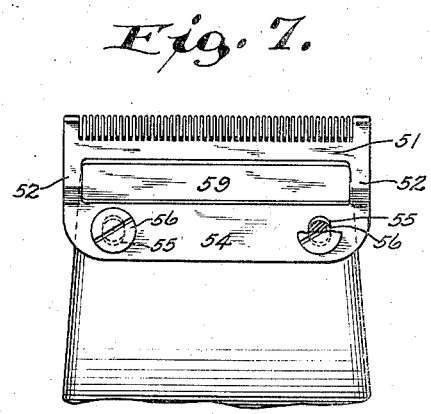
Fig. 7 is a fragmentary view looking at the front of the guard member of said modification.

Referring now to Figs. 6 and 7, a slight modification is illustrated wherein the guard or comb member 51 has spaced downwardly extending arms 52 which are bent inwardly as at 53 to join with an attachment plate 54. The attachment plate 54 is formed with oval openings 55 through which bolts 56 are inserted to secure the guard to the shaving handle. The openings 55 provide for adjustment in a vertical direction when the bolts are loose, and this adjustment will not only change the amount which the forward edge 57 of the guard projects beyond the face engaging portion 46, but will also simultaneously vary the width of the gap A. This variation in the width of the gap A occurs because of the fact that in moving the plate 54 upwardly along the angled surface 58, there is naturally an outward movement of the free edge 57 to widen the gap A at the same time that the edge 57 is being projected outwardly. In Fig. 6 the adjustment is such that the forward edge 57 of the guard is at the line B. Substantially the same adjustment as shown in Fig. 2 may also be obtained.

It is to be noted that in this form of the invention the spaced arms 52 for supporting the guard 51 provide an opening 59 directly below the teeth of the movable cutter through which cut hair may fall freely to the exterior.

Figure 9:
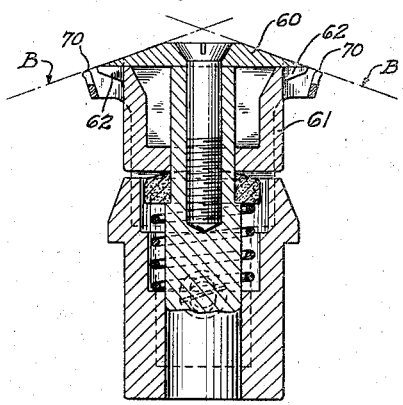
Fig. 9 is a vertical sectional view through a shaving head, illustrating the association of the guard of Fig. 8 with the rest of the device.
Figure 8:
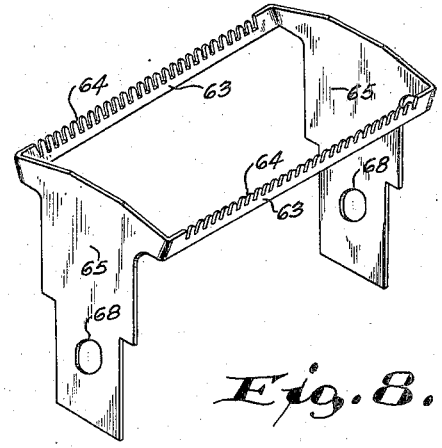
Fig. 8 is a perspective view of a guard member used in still another form of the invention.
Figure 10:
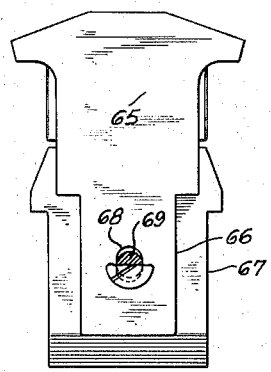
Fig. 10 is an end view of the shaving head of Fig. 9.

Referring to Figs. 8 to 10 inclusive, a shaving head is illustrated which is similar in construction to that shown and described in co-pending application Serial No. 124,416, filed February 6, 1937. The numeral 60 designates a fixed cutter having slots on opposite edges thereof. The movable cutter 61 has teeth 62 movable below the slots of the fixed cutter. Guard members 63 which are slotted at 64, provide combs for straightening out and guiding the hair to the cutters. These guard members 63 are supported by the upper corners of end plates 65 as illustrated in Figs. 8 and 10. The end plates 65 fit in recesses 66 at the ends of the block 67 and are formed with oval apertures 68. Bolts 69 may extend through said apertures into the block 67 to hold the end plates and guards in position. These oval openings 68 permit the position of the forward edges 70 of the guards to be varied with respect to the line B. The remaining parts of this construction are the same as described in co-pending application Serial No. 124,416.

Referring now more particularly to Figs. 11 to 22 inclusive, still another form of shaving device is illustrated. In said construction the numeral 71 designates a handle forming a housing for the motor 72 operating an armature 73. The outer end 74 of the armature is bent to project into an opening 75 at the end of the handle.

Secured to said end of the handle by bolts 76 threaded into openings 77 is a supporting block 78 (see Figs. 13 and 14). The supporting block has a central opening 79 which is adapted to register with the opening 75 of the handle. The ends of the block 78 are formed with posts 80 having tapped holes 81, and said block is also formed with elongated grooves 82 within which strips of felt or other flexible material 83 are secured (see Fig. 21).

A movable cutter 84 having cutting teeth 85 on both edges thereof is formed with end recesses 86 through which the posts 80 of the block 78 extend. The cutter 84 also has its bottom projecting downwardly as at 87 (see Fig. 16), and said projection 87 has its lower surface formed with spaced grooves 88.

The outer end portion 74 of the armature has spring members 89 secured thereto by bolts 90 (see Figs. 11 and 19). These springs project beyond the end of the armature and are accordion pleated as at 91, within the opening 79 of the block 78. The outer edges 92 of the spring members are inserted into the grooves 88 of the cutter as shown in Fig. 16, and the spring members are also formed with ears 93 which engage the sides of the cutter projection 87. Thus the spring members are secured to the cutter in a simple manner while insuring maintenance of the cutter in proper alinement.

The fixed cutter or face engaging member 94 is formed with slots 95 at opposite edges thereof, and said member preferably has the cross sectional shape illustrated in Fig. 18. The face engaging member is secured to the posts 80 of the block 78 by bolts extending through countersunk openings 96 of the face engaging member and into the tapped holes 81 of the posts 80. It is thus apparent that the accordion pleated portions 91 of the springs urge the movable cutter into close contact with the lower surface of the face engaging member, and it is also apparent that by operation of the electric motor 72 the movable cutter 84 will be reciprocated beneath the fixed cutter. This reciprocable movement is permitted by the depth of the recesses 86 of the movable cutter, which recesses loosely embrace the posts 80 of the block 78.

The felts 83 shown in Fig. 21 are of such width that the outer portions thereof may be bent outwardly as illustrated in Fig. 21 to frictionally engage the lower surface of the movable cutters and form a seal against the entrance of cut hair.

A guard member 97 is provided for each shaving edge, and each guard member has its forward edge slotted as at 98 (see Fig. 20). Each guard member also has inwardly extending arms 99 connected to the lower portion of the ends of the guard, which arms merge into larger attachment plates 100 having apertures 101. The attachment plates 100 fit adjacent the ends of the block 78 as illustrated in Figs. 12 and 22, and are secured thereto by bolts 102 extending through the apertures 101 and threaded into the ends of the block 78. It is to be noted that the openings 101 are of larger diameter, preferably by one-thirty-second of an inch, than the bolts 102. Thus the critical relationship between each guard member and the edge of the face engaging member may be independently varied to produce the perfect shaving conditions heretofore described in connection with Figs. 1 and 2. The forward edge of the guards in this form of the invention is formed with a relatively large bead 103 as illustrated in Fig. 22, and with this form of guard a very desirable adjustment for many types of faces is to have no gap between the beads 103 and the free edges of the face engaging member. For such an adjustment it is also desirable to have the forward portion 104 of each guard substantially at the line B which designates the plane of the face engaging portion of the fixed cutter 94. This relationship between the guards and the face engaging member may, however, be readily varied to bring about relationships of the types shown in Figs. 1 and 2.

The slots in the guard and face engaging member at one edge may be of less width than the slots at the opposite edge to take care of different skin conditions.

In the form of the invention just described, openings 105 are provided at the ends of the head for the insertion of a cleaning brush. It is also apparent that the method of supporting the guards permits the hair to fall freely from the bottom of the cutter through the spaces 106.

From the above it is apparent that in all forms of the invention the critical relationship between the position of the guard and the position of the face engaging member may be varied to readily adapt the devices for perfect shaving for a particular type of skin. In this connection, and referring more particularly to Figs. 1 and 2, it has been found that if the gap A is ten thousandths of an inch or less in width, the guard can be lowered to the position of Fig. 1 or substantially to the line B without producing irritation. If the guard is lower than the line B of Fig. 1, then irritation will result. It has also been found that if the width of the gap is increased over the original ten thousandths of an inch, then the forward edge 45 of the guard should be projected one-half to one thousandths of an inch beyond the line B. By thus providing for this variation, it is possible to readily bring about the perfect shaving condition illustrated in Fig. 5.

Certain of the subject matter shown and described in this application is common to applications 124,416 and 124,417, filed February 6th, 1937 and referred to heretofore.

While only a few forms of the invention have been shown and described, various modifications may be made without departing from the spirit of the invention, and all of such changes are contemplates as may come within the scope of the claims.

What I claim is:

1. In a shaving device, a support having a top face engaging member provided with a thin free slotted edge on each side thereof projecting beyond the corresponding sides of the support, a reciprocable cutter having teeth movable below said slotted edges of the face engaging member, a separate guard positioned adjacent each of said slotted edges and extending at an angle with respect thereto, arms extending inwardly from the ends of each guard to support said guard with its lower edge spaced from the supporting means whereby hair may fall straight downwardly from beneath the cutter thru said space between the lower edge of the guard and the supporting means to the exterior, an attachment plate connected to each arm, each attachment plate terminating substantially midway of the adjacent end of the head, and means for securing said attachment plates to said ends of the head, said means providing for minute variation in the critical relationship between the position of each guard and the adjacent face engaging member.

2. In a shaving device, a fixed blade, a cutter movably mounted below said fixed blade, a motor, a member reciprocated by said motor, and a band spring having accordion pleats therein connecting said member to said cutter for transmitting motion to the latter and for urging the same into close engagement with the fixed blade.

3. In a shaving device, a fixed blade, a cutter movably mounted below said fixed blade and having a projection from its bottom provided with spaced grooves, a motor, a member reciprocated by said motor, and a pair of band springs connected to and projecting from the end of said member, said band springs having their outer ends inserted in said grooves of the cutter projection and serving to transmit motion to the cutter and to urge the same into close engagement with the fixed blade.

4. In a shaving device, a support, a face engaging member mounted on said support and provided with a thin free slotted edge projecting beyond the front of the support a sufficient distance so that cut hair may drop straight downwardly to the exterior, a reciprocable cutter having teeth movable below said free slotted edge of the face engaging member, a U-shaped guard member having its front portion positioned adjacent said free slotted edge of the face engaging member and extending at an angle with respect thereto, said guard member also having arms extending inwardly from its end edges and means for securing said arms to the sides of the support, said guard member having the lower edge of its front portion spaced outwardly from the front of the support whereby there is a space between said edge and the support thru which said cut hair may fall straight downwardly to the exterior.

5. In a shaving device, supporting means, a face engaging member connected to said supporting means and having a thin free slotted edge projecting beyond the supporting means a sufficient distance so that cut hair may drop straight downwardly to the exterior, a reciprocable cutter having teeth movable below said free slotted edge of the face engaging member, a guard positioned adjacent the free slotted edge of the face engaging member and extending at an angle with respect thereto, arms extending inwardly from the ends of said guard to support said guard with its lower edge spaced from the supporting means whereby said cut hair may fall straight downwardly from beneath the cutter through said space between the lower edge of the guard and the supporting means to the exterior without obstruction from said guard, said arms having apertures therein, and bolts extending through said apertures for securing said arms to the supporting means, there being clearance between said apertures and said bolts to provide for variation in the critical relationship between the position of the guard and the face engaging member.

6. In a shaving device, a support, a face engaging member mounted on said support and provided with a thin free slotted edge, a reciprocable cutter having teeth movable below said free slotted edge of the face engaging member, a U-shaped guard member having its front portion positioned adjacent said free slotted edge of the face engaging member and extending at an angle with respect thereto, said guard member also having arms extending inwardly from its end edges, and formed with apertures, bolts extending through said apertures for securing said arms to the supporting means, there being clearance between said apertures and said bolts to permit movement of the arms in any direction around said bolts and lateral movement of the guard toward or away from the free edge of the face engaging member and also above or below the plane of the face engaging member.

MATHEW ANDIS.